United States Patent
Roccanova (12) 
(10) Patent No.: US 6,522,658 B1
(45) Date of Patent: Feb. 18, 2003

(54) METHOD FOR DISCRIMINATING AND ROUTING DATA PACKETS BASED ON QUALITY-OF-SERVICE REQUIREMENTS

(75) Inventor: Gerard Roccanova, Huntington Beach, CA (US)

(73) Assignee: TRW Inc., Redondo Beach, CA (US)

(*) Notice: Subject to any disclaimer, the term of this patent is extended or adjusted under 35 U.S.C. 154(b) by 0 days.

(21) Appl. No.: 09/327,425

(22) Filed: Jun. 7, 1999

(51) Int. Cl.[7] .................................................. H04J 17/02
(52) U.S. Cl. ........................ 370/441; 370/353; 370/320; 455/428
(58) Field of Search ................................. 370/316, 320, 370/335, 342, 352, 353, 354, 395.21, 441; 375/130; 455/12.1, 13.1, 427, 428

(56) References Cited

U.S. PATENT DOCUMENTS

| | | | |
|---|---|---|---|
| 4,455,651 A | * 6/1984 | Baran | 375/130 |
| 5,406,550 A | * 4/1995 | McTiffin | 370/395 |
| 5,940,379 A | * 8/1999 | Startup et al. | 370/320 |
| 6,078,810 A | * 6/2000 | Olds et al. | 455/428 |
| 6,088,571 A | * 7/2000 | Kane et al. | 455/12.1 |
| 6,104,709 A | * 8/2000 | Rinchiuso et al. | 370/335 |
| 6,208,625 B1 | * 3/2001 | Zancho et al. | 370/316 |
| 6,347,091 B1 | * 2/2002 | Wallentin et al. | 370/437 |
| 6,370,127 B1 | * 4/2002 | Daraiseh et al. | 370/328 |
| 6,393,047 B1 | * 5/2002 | Popovic | 375/140 |

* cited by examiner

Primary Examiner—Kenneth N Vanderpuye
(74) Attorney, Agent, or Firm—Harness, Dickey & Pierce (57) ABSTRACT

A method is provided for discriminating and routing data packets in a satellite-based communication system (10), comprising the steps of: (a) receiving an input data stream from an application residing on a transmitting device (12); (b) selecting either a first spread spectrum code or a second spread spectrum code based on the quality of service (QOS) requirements associated with the first application; (c) applying the selected spread spectrum code to the input data stream, thereby generating a spread spectrum data stream; (d) transmitting the spread spectrum data stream from the transmitting device (12) to a network routing device (14); (e) correlating the spread spectrum data stream with the corresponding selected spread spectrum code to recover the original input data stream; and (f) routing the input data stream to either a low earth orbiting satellite (16) when the first spread spectrum code is used to recover the input data signal or to a geosynchronous orbiting satellite (18) when the second spread spectrum code is used to recover the input data signal.

15 Claims, 7 Drawing Sheets

METHOD FOR DISCRIMINATING AND ROUTING DATA PACKETS BASED ON QUALITY-OF-SERVICE REQUIREMENTS

BACKGROUND OF THE INVENTION

1. Field of the Invention

This invention relates generally to a satellite communication system and, more particularly, to a method for discriminating and routing data packets based on quality of service (QoS) requirements of the providing application.

2. Discussion of the Related Art

Modern communication systems are primarily based on packet switching networks which are able to support voice, video and other data types all within the context of the same network infrastructure. A relatively small amount of the communication traffic, such as voice traffic, puts a very high demand on the system to handle stringent quality of service (QoS) requirements (e.g., latency). On the other hand, a larger percentage of the communication traffic does not need to meet QoS requirements. In these instances, the non-QoS data packets merely require retransmission and intermediate data buffering when errors occur in the communication link.

Therefore, it is desirable to provide a communication system that utilizes two or more network services that are each optimized to handle a different type of communication traffic. For instance, voice data packets may be directed to a narrow band network service; whereas non-QoS data packets may be diverted to a broadband network offering best effort delivery service. Discriminating and routing data packets based on QoS requirements is of particular importance in satellite-based communication systems where orbital designs must accommodate the need for short round trip times required for voice data.

Low earth orbiting (LEO) satellite systems generally offer advantages over geosynchronous orbiting (GEO) satellite systems for the delivery of QoS data packets. The advantages primarily stem from an orbit selection that facilitates the use of low-power transmitting devices as well as reduces the long propagation delays inherent in GEO satellites systems. However, the number of LEO satellites needed to cover a relatively large service area is considerably more than those required to cover a comparable service area in a GEO satellite system. Therefore, LEO satellite systems are usually optimized for only voice data and other QoS data packets.

On the other hand, GEO satellite systems generally offer advantages for delivery of non-QoS data packets needing best effort delivery service. Its orbit selection allows a single GEO satellite to serve a relatively large service area, thereby reducing the cost of deployment. In order to support a best effort delivery service, GEO satellites are configured with minimal on board circuitry which is needed for retransmission and data buffering of data packets when an error occurs in the communication link. Thus, GEO satellite systems are best suited to handle streaming video, file transfer, multicasting, and other typically broadband IP-based data packets.

Accordingly, there is a need for the ability to discriminate among the different types of data packets (i.e., QoS and non-QoS data packets) that are being transmitted in a satellite-based communication system. A mobile network routing device is used to route the data packets to an appropriate communication infrastructure. The present invention routes the data packets based on the QoS requirements associated with the application providing the data packets. In addition, the invention relies on a unique physical layer that implements synchronized time division duplex, spread-spectrum connections that are channelized by CDMA techniques.

SUMMARY OF THE INVENTION

In accordance with the present invention, a method is provided for discriminating and routing data packets in a satellite-based communication system, comprising the steps of: (a) receiving an input data stream from an application residing on a transmitting device; (b) selecting either a first spread spectrum code or a second spread spectrum code based on the quality of service (QOS) requirements associated with the first application; (c) applying the selected spread spectrum code to the input data stream, thereby generating. a spread spectrum data stream; (d) transmitting the spread spectrum data stream from the transmitting device to a network routing device; (e) correlating the spread spectrum data stream with the corresponding selected spread spectrum code to recover the original input data stream; and (f) routing the input data stream to either a low earth orbiting satellite when the first spread spectrum code is used to recover the input data signal or to a geosynchronous orbiting satellite when the second spread spectrum code is used to recover the input data signal.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof, and additional fields in which the present invention would be of significant utility.

Figure 1:
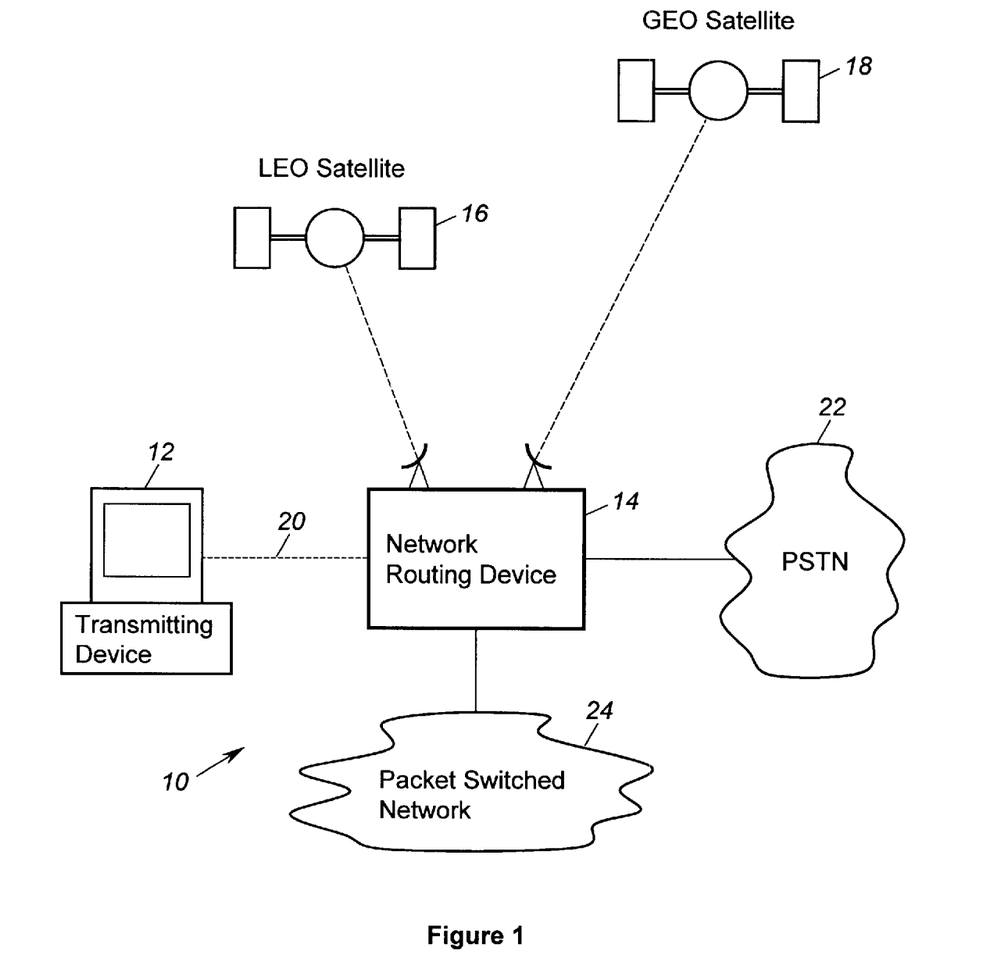
FIG. 1 is a diagram depicting a satellite communication system in accordance with the present invention.

A satellite-based communication system 10 in accordance with the present invention is depicted in FIG. 1. The satellite communication system 10 includes a transmitting device 12, a network routing device 14, a low earth orbiting (LEO) satellite 16 and a geosynchronous orbiting (GEO) satellite 18. The transmitting device 12 is operative to transmit an outgoing. data stream over a communication channel 20 to the network routing device 14. In a preferred embodiment, the transmitting device 12 is comprised of a portable computing device, a cellular telephone handset device or some other personal communication device which uses a wireless RF-based communication channel to communicate with the network routing device 14. It is also envisioned that the transmitting device 12 may be a general purpose computer or some other computing device having a hardwire connection to the network routing device 14.

The network routing device 14 receives the transmitted data stream from the transmitting device 12 and routes it to an appropriate satellite communication system. The network routing device 14 may also divert the data stream via a hardwire connection to a more conventional communication system, such as a public switched telephone network (PSTN) 22, a packet switched network 24 or some other personal communication service (PCS) network.

In a typical satellite communication system, information is generally uplinked from a transmitting ground station to a satellite which in turn downlinks the information to a receiving ground station. Thus, the network routing device 14 serves as a ground station which is able to uplink the data stream received from the transmitting device 12 to either of the LEO satellite 16 or the GEO satellite 18. It is envisioned that the network routing device 14 will also be able to receive a downlink data stream from either of the satellites. In either case, the satellite completes a virtual circuit connection between the network routing device 14 and one of a plurality of other ground stations (not shown). GEO satellite systems are well known to one skilled in the art; whereas the Globalstar System from Globalstar Telecommunications Ltd. of New York, N.Y. is an example of a commercially available LEO satellite service that may be used in the conjunction with the present invention. As will be apparent to one skilled in the art, the network routing device 14 is equipped with an appropriate ground station interface for each satellite system.

Two or more applications residing on the transmitting device 12 may require access to the common communication channel 20. In general, multiple access communication systems provide ordered access to a common communication channel. Time division multiple access (TDMA) and frequency division multiple access (FDMA) are two conventional techniques for sharing a common communication channel. In recent years, code division multiple access (CDMA) has emerged as a means for sh a common communication channel.

CDMA is a coding scheme based on a technique known as spread spectrum in which a data stream is transmitted in a bandwidth considerably greater than the frequency content of the original input data stream. In other words, the input data stream is modulated by a spread spectrum code at a much higher data rate than that of the input data stream. As a result, the output data stream has many more transitions than the input data stream, and thus results in a transmitted signal "spread" over a wide band of frequencies. The input data stream may be recovered by correlating the received data. signal with the spread spectrum code at a receiving device.

Figure 2:
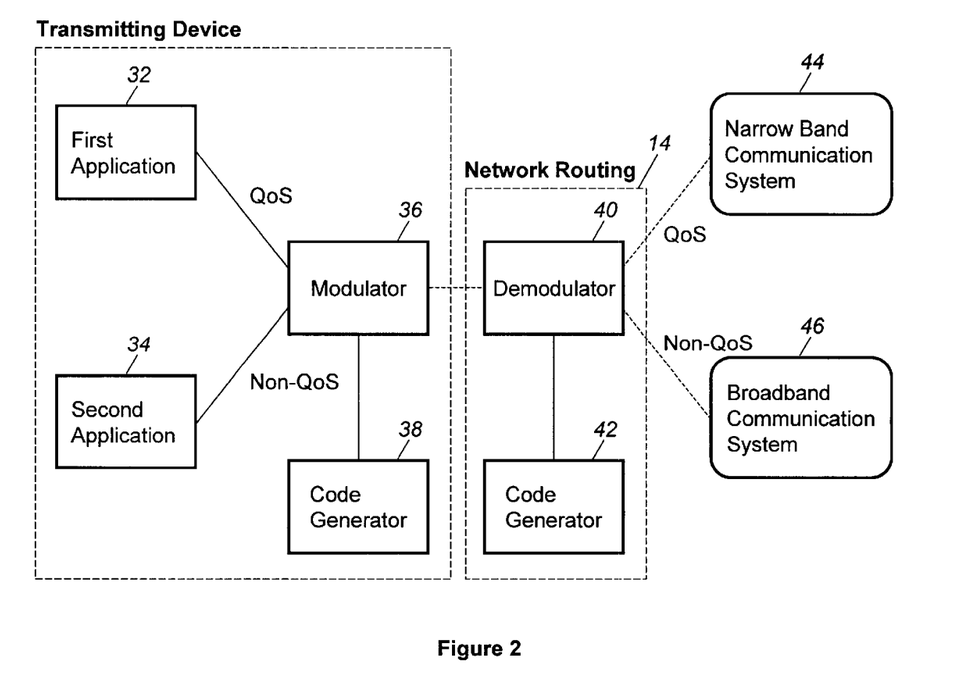
FIG. 2 is a block diagram showing the primary components in the satellite communication system of the present invention.
Figure 3:
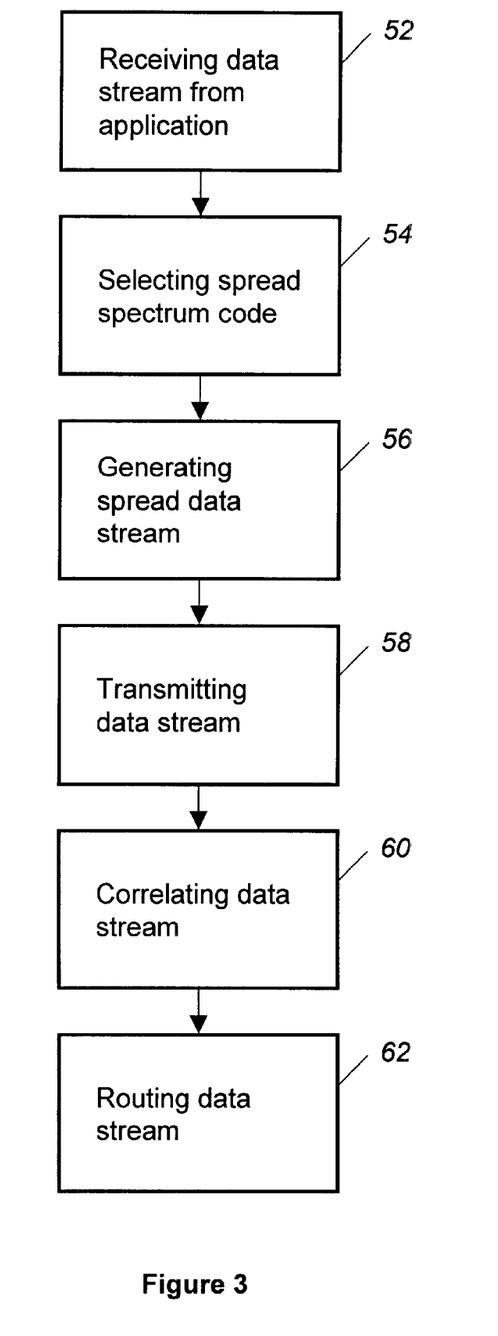
FIG. 3 is a flowchart showing how to discriminate and route data packets in accordance with the present invention.

Referring to FIGS. 2 and 3, the present invention is able to discriminate amongst different types of data packets by using CDMA techniques. Again, two or more applications may reside on the transmitting device 12, where at least two of the applications have different QoS requirements. For instance, a first application 32 may support an Internet phone call that transmits and receives voice over IP (VOIP) data packets and a second application 34, such as a web browser, may need to transmit and receive non-QoS data packets. A modulator 36 receives a data stream from one or more of the applications. In order to distinguish between the different types of data packets, the modulator 36 selects a spread spectrum code from a code generator 38 based on the QoS requirements associated with the application providing the data stream. The selected spread spectrum code is then applied to the outgoing data stream prior to its transmission to the network routing device 14.

A method for discriminating and routing data packets in a single data stream is shown in FIG. 3. First, an input data stream is received 52 from an application residing on the transmitting device 12. Next, a spread spectrum code is selected 54 and applied 56 to the input data stream, thereby generating a spread spectrum data stream. Depending on the application providing the input data stream, either a first spread spectrum code (which may correspond to QoS data streams) is used to generate the spread spectrum data stream or a second spread spectrum code (which may correspond to non-QoS data streams) is used to generate the spread spectrum data stream. The spread spectrum data stream is then transmitted 58 from the transmitting device 12 to the network routing device 14.

At the routing device, the received spread spectrum data stream is correlated 60 with the corresponding spread spectrum code to recover the original data stream. When the first spread spectrum code is used to recover the data stream, the data stream is routed 62 to narrow band communication system 44 (e.g., a LEO satellite). When the second spread spectrum code is used to recover the data stream, the data stream is routed to broadband communication system 46 (e.g., a GEO satellite). Thus, the present invention is able to discriminate and route data packets received from the transmitting device 12 to the most appropriate and cost effective communication infrastructure.

To provide simultaneous access for two or more applications, spread spectrum data streams can be combined into a single IP data stream prior to transmission from the transmitting device 12. In a preferred embodiment, the present invention supports up to four different spread spectrum codes that may be used to modulate an input data stream received from an application. In this way, four simultaneous virtual circuits or links can be established between the transmitting device 12 and the network routing device 14. Alternatively, two or more of the links can be used by a single application, thereby increasing the available bandwidth for the data stream provided by that application.

As will be more fully explained below, a preferred embodiment of the present invention uses a synchronized time division duplex, spread spectrum connection that is channelized by CDMA techniques to communicate between the transmitting device 12 and the network routing device 14. In this way, the present invention facilitates the use of mobile devices (both transmitting devices and network routing devices) that can be easily assimilated with other nodes within a terrestrial wireless communication infrastructure.

Figure 4:
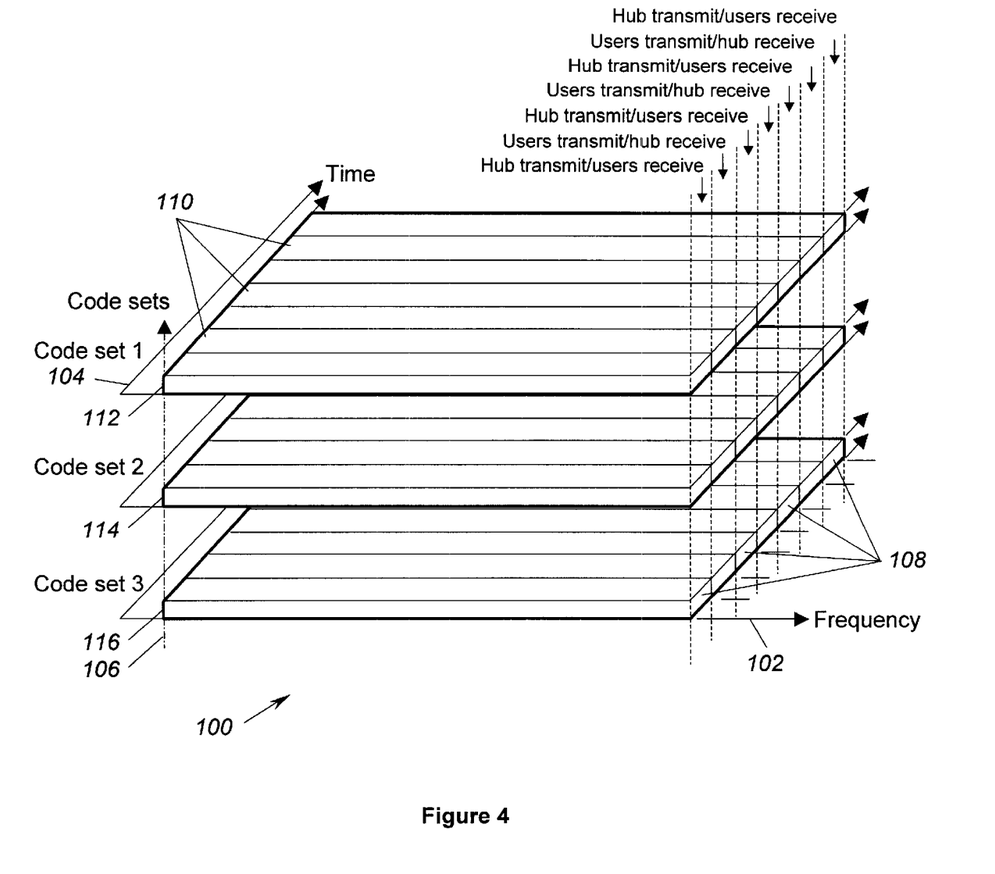
FIG. 4 illustrates a time division duplex, code division multiple access communication technique in accordance with the present invention.

FIG. 4 illustrates a time division duplex, code division multiple access communication structure 100 that may used to support wireless communication between these devices.

The structure 100 includes a frequency axis 102, time axis 104, and a code axis 106, as well as hub transmit windows 108 and hub receive windows 110. A first signal 112, a second signal 114, and a third signal 116 are also identified in FIG. 4.

In the structure 100, the frequency axis 102 represents a frequency bandwidth associated with a spread spectrum signal. For example, each CDMA signal may occupy a bandwidth of 1.25 MHz. The code axis 106 indicates a separation between individual communication signals with unique spreading codes. Thus, the first signal 112 is spread with, for example, a CDMA spreading code unique from that used to spread the second signal 114 and the third signal 116. Furthermore, a time division structure is imposed on each CDMA link to divide the CDMA links into transmit windows 108 and receive windows 110. The structure 100 as shown in FIG. 4 provides the present invention with a time division duplex, code division multiple access physical layer.

Figure 5:
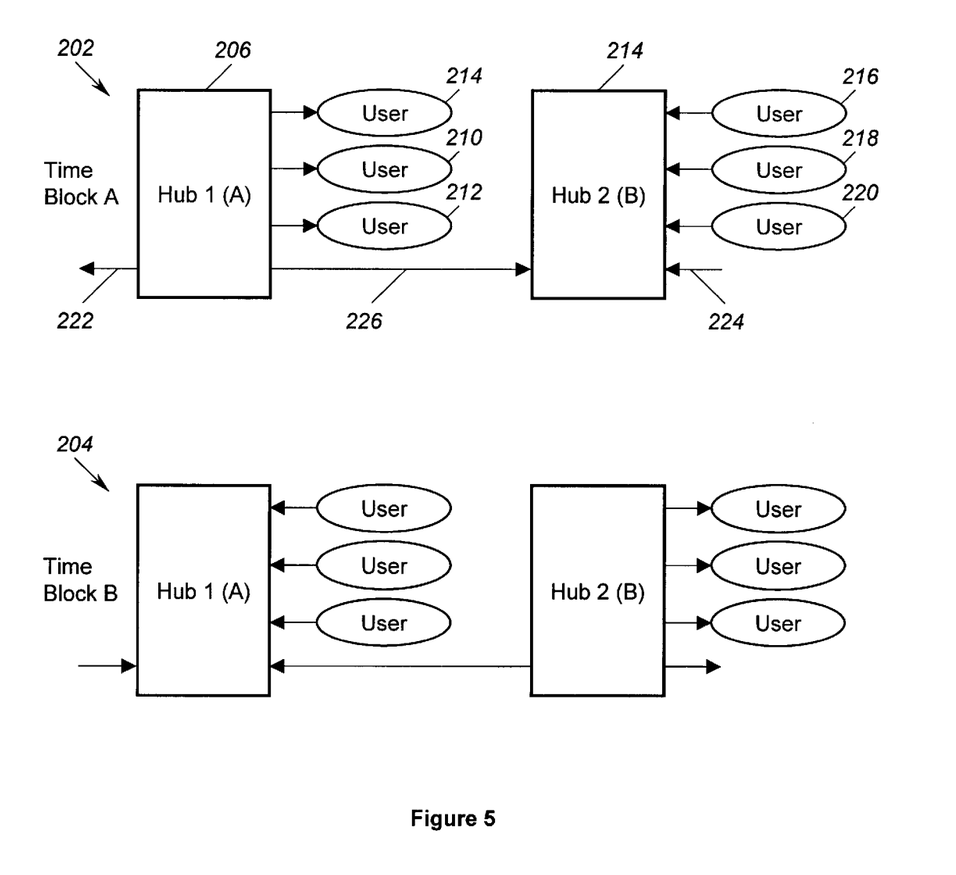
FIG. 5 illustrates how time division occurs between two or more nodes in the network structure of the present invention.

The schematic diagram of FIG. 5 shows how the time division occurs between two or more nodes in the present invention. FIG. 5 generally shows a transmit window 202 and a receive window 204 (both with respect to the "type A" hub node 206). In the transmit window 202, a first hub node 206 (which may be, for example, the network routing device) is shown transmitting to a plurality of user nodes 208–212 (which may be, for example, a series of transmitting devices). The hub node 206 is also shown transmitting to a second hub node 214 over the link 226. In this case, the second hub node 214 may be another network routing device within the network. The second hub node 214 is in turn shown receiving from a plurality of other user nodes 216–220. Lastly, the wireless links 222 and 224 may connect the hubs 206 and 214 to one or more additional nodes (not shown).

The transmit window 202 establishes a time during which signals are transmitted from the first hub node 206. The transmit window for the first hub node 206 is thus the receive window for the user nodes 208–212 and the second hub node 214. In general, when a new node assimilates to another node, the new node adopts the opposite transmit and receive timing. Thus, the communication network may be considered to include type A nodes and type B nodes, depending on when their particular transmit and receive windows occur.

As an example, the first hub node 206 is labeled a type A node. The user nodes 208–212 and the second hub node 214 adopt the opposite transmit and receiving window timing from the hub node 206 and thus are labeled type B nodes. In addition, the user nodes 216–220, which assimilate to the second hub node 214, are type A nodes (having assimilated to a type B node), and therefore transmit and receive during the same intervals as the first hub node 206.

With respect to the receive window 204, FIG. 5 shows that the first hub node 206 receives from the user nodes 208–212 and the second hub node 214. On the other hand, the second hub node 214 transmits to the user nodes 216–220. In other words, the receive window 204 establishes a time during which signals are transmitted from type B nodes.

The transmit window 202 and the receive window 204 illustrate the time division duplex nature of communications in the present invention. The first hub node 206 and the second hub node 214 alternately transmit and receive in time in a ping-pong fashion. Thus, no frequency guard bands or expensive frequency isolation equipment is required as is commonly found in full duplex communication systems which use separate transmit and receive frequencies. In general, each link between two nodes is supported by a separate spreading code and divided into a time division structure. It is also noted that the transmit windows and receive windows may vary widely in duration and need not be of equal length.

Figure 6:
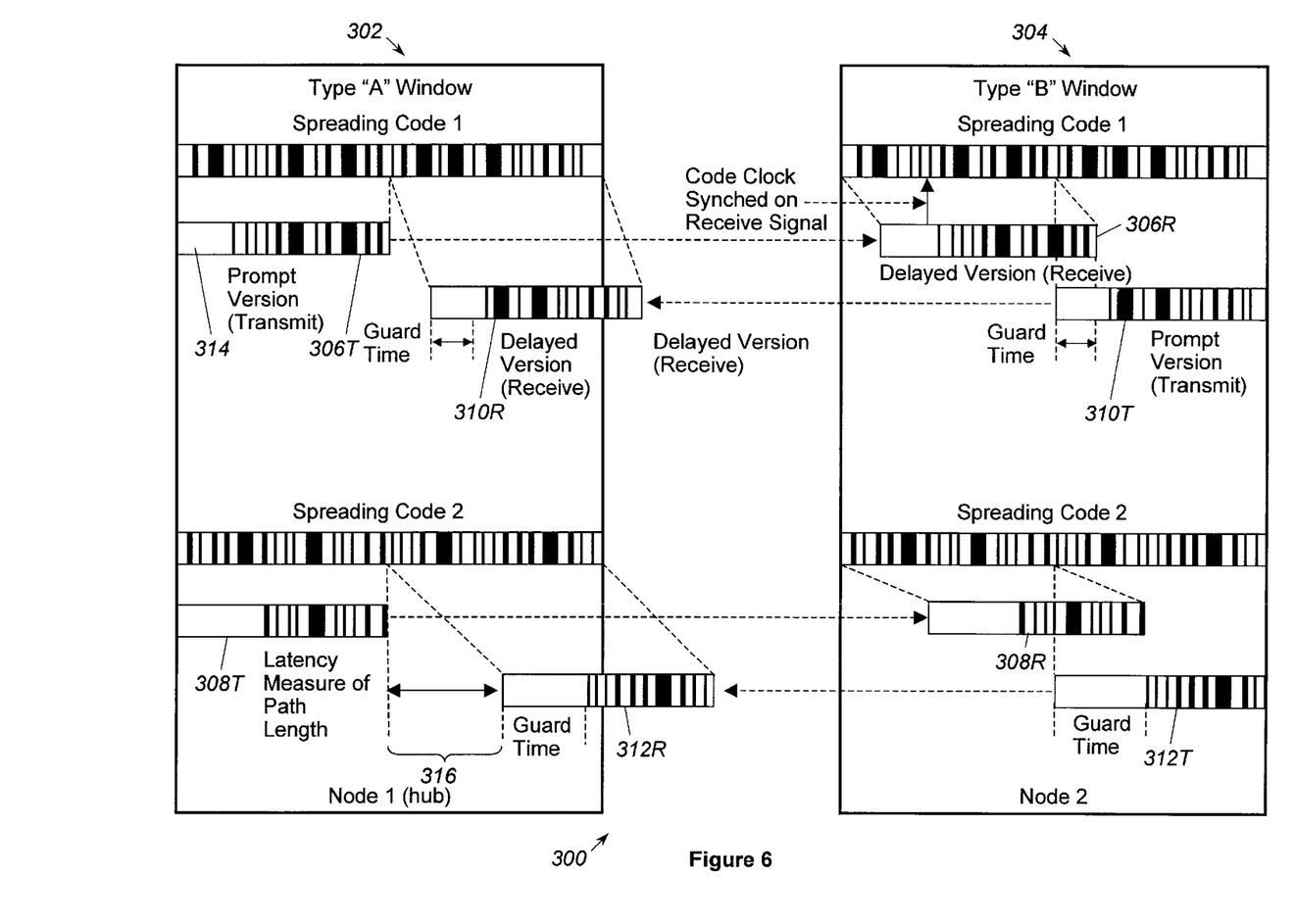
FIG. 6 illustrates the transmit and receive timing for two types of nodes in the network structure of the present invention.

In FIG. 6, a diagram 300 shows the transmit and receive timing for type A and type B nodes. A type A window 302 and a type B window 304 are shown. The type A node transmits a first signal 306T with a first spreading code and a second signal 308T with a second spreading code. The type A node also receives, subsequently, a third signal 310R on the first spreading code and a fourth signal 312R on the second spreading code. Similarly, the type B node transmits the signal 310T with the first spreading code and the signal 312T with a second spreading code. The type B node also receives, initially, the signal 306R on the first spreading code and the signal 308R on the second spreading code.

The type A nodes transmits the signal 306T to the type B node which includes a portion of guard time 314 (as do the other signals). The signal 306T is transmitted in accordance with transmit window timing (and received as signal 306R), but may be delayed or advanced depending on propagation delay considerations. In other words, the type A node receives the signal 310R (in response to the transmitted signal 310T) from the type B node and may determine a round trip propagation delay that indicates how far to advance or retard transmit timing. Furthermore, the distance determination may be used to adjust transmit power or receive gain, thereby preventing nearer, stronger signals from overwhelming weaker signals generated farther away.

The propagation delay is also indicated in FIG. 6 with respect to the signals 308T, 308R, 312T, and 312R, and the round trip delay 316. In conjunction with the overall timing structure of the present invention, a mechanism for distributing absolute time is also provided. Suitable mechanisms include those used in, for example, the IP time protocol, :laser range finders, and aircraft distance measuring equipment.

Figure 7:
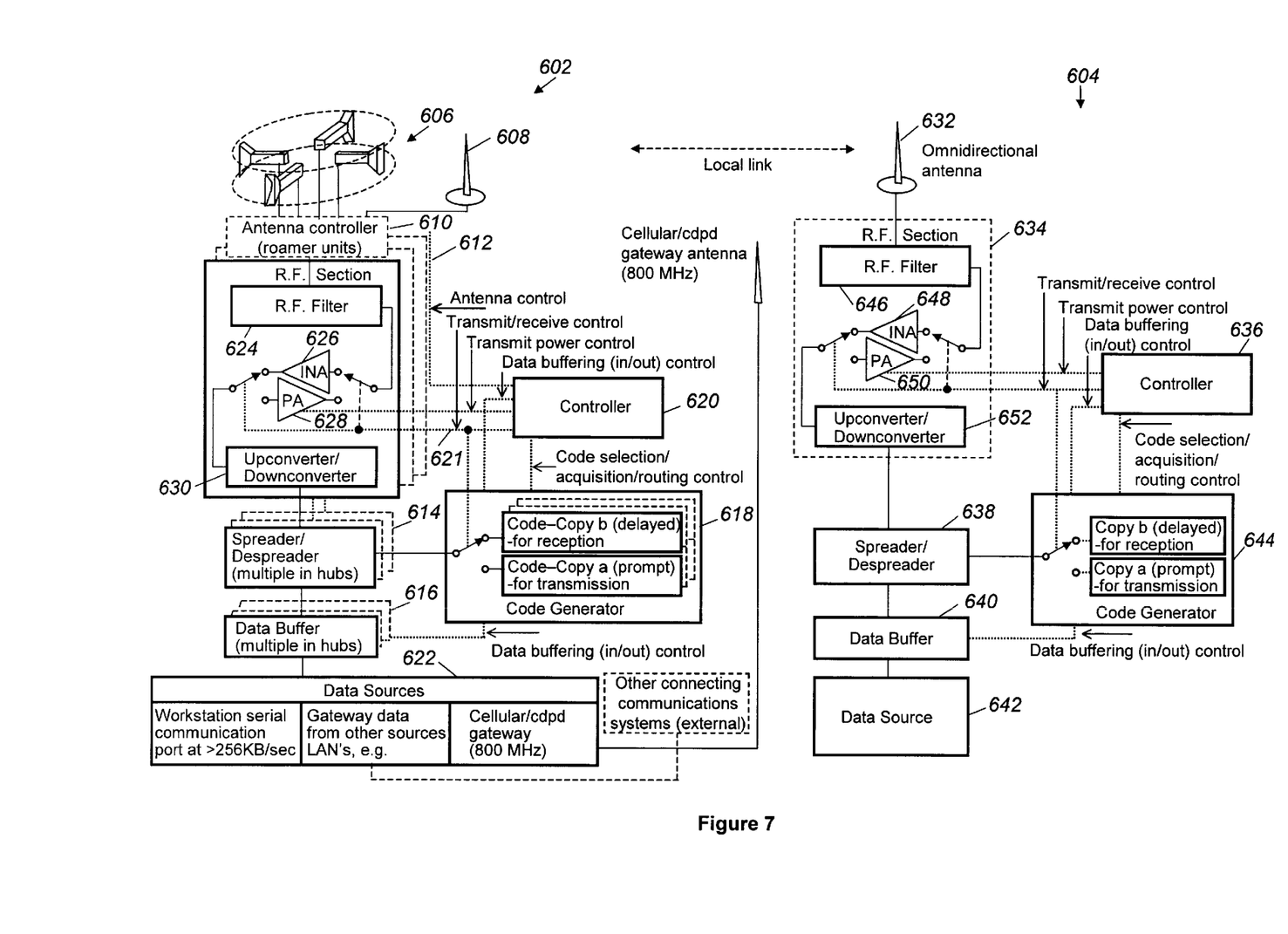
FIG. 7 illustrates exemplary hardware implementation of the transmitting device and the network routing device in accordance with the present invention.

FIG. 7 shows one example of the hardware that may be used to implement a wireless communication channel between the transmitting device 12 and the network routing device 14. The network routing device 602 includes a directional antenna 606 and an omni-directional antenna 608 connected to an antenna controller 610. As an example, the antenna controller 610 may allow a roamer unit (equipped with both types of antennas) to use the high power directional antenna 606 to search for a channel and subsequently switch to the lower power omnidirectional antenna for subsequent communication. The network routing device 602 also includes one or more RF sections 612, spreaders 614, and data buffers 616. A code generator 618 and system controller 620 (with transmit/receive control output 621) are also shown, as well as external data sources 622. Each RF section 612 includes an RF filter 624, a low noise amplifier (LNA) 626, a power amplifier (PA) 628, and an upconverter/downconverter 630.

During a transmit window, for example, the controller 620 reads data from the data buffer 616, and applies it to the spreader 614 in conjunction with the appropriate spreading code selected by the code generator 618. The controller 620 may be implemented with discrete circuitry or using a CPU and associated memory. The data may originate from numerous sources, including, for example, a satellite downlink interface, a workstation data link, a cellular network, or a hardwired Ethernet connection.

The spread signal is applied to the upconverter 630 where it is shifted in frequency (e.g., to a band in the 900 MHz region). The PA 628 amplifies the resultant signal and feeds it to the filter 624. The filtered signal is driven through one or more of the antennas as selected by the antenna controller 610.

The controller 620 operates in synchronism with clock signals (not shown), including CDMA chip clocks, that delineate the transmit and receive windows. The clock signals may also be used by the spreader 614 and data buffer 616 to control delays that compensate for propagation delay over a wireless link to another node. Multiple copies of the RF section 612, spreader 614, and data buffer 616 may be provided and associated with individual links.

Furthermore, the code generator 618 stores multiple spreading codes. The code generator 618 typically supplies the spreading code for transmission without compensating for propagation delay (i.e., a "prompt" version of the code). While receiving, however, the code generator 618 may provide a copy of the code (associated with a particular link) delayed to compensate for propagation delay to the spreader 614. It is further noted that all outgoing links are transmitted simultaneously during the transmit window and all links are received simultaneously during the receive window.

During the receive window, the antennas receive an impinging signal and provide it to the RF filter 624. The signal flows through the LNA 626 for amplification and to the upconverter/downconverter 630 for frequency translation to an intermediate frequency. The resultant signal is despread in the spreader 614 under control of the spreading code appropriate for the link. The data recovered from the despread signal is saved in the data buffer 616. Turning now to the transmitting device 604, it includes many of the same components as the network routing device 602. The transmitting device 604, however, includes a single instance of several hardware components. The local node 604 includes an omnidirectional antenna 632, an RF section 634, and a system controller 636. A spreader 638, data buffer 640, a data source 642, and a code generator 644 are also present. The RF section 634 includes an RF filter 646, LNA 648, PA 650, and a upconverter/downconverter 652.

The hardware components of the transmitting device 604 operate as explained above with respect to the network routing device 602. Although shown with only a single RF section 634, for example, the transmitting device 604 may include additional hardware to support additional links (to provide, for example, additional bandwidth). In the preferred embodiment of the present invention, the transmitting device 604 includes four sets of hardware to support the multiple concurrent links provided between the transmitting device and the network routing device.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A method of discriminating and routing data packets that are transmitted in a single data stream, comprising the steps of:
   providing a spread spectrum data stream using either a first spread spectrum code or a second spread spectrum code;
   transmitting said spread spectrum data stream from a transmitting device over a communication channel to a network routing device;
   correlating said spread spectrum data stream with the corresponding first spread spectrum code or second spread spectrum code to recover an outgoing data stream;
   routing said outgoing data stream to a broadband communication system when said first spread spectrum code is used to recover said outgoing data stream; and
   routing said outgoing data stream to a narrow band communication system when said second spread spectrum code is used to recover said outgoing data stream.

2. The method of claim 1 wherein the step of transmitting said spread spectrum data stream further comprises using a time division duplex, code division multiple access (CDMA) communication protocol.

3. The method of claim 1 wherein the step of transmitting said spread spectrum data stream further comprises using a wireless radio frequency (RF) communication channel.

4. The method of claim 1 wherein the step of providing a spread spectrum data stream further comprises the steps of:
   receiving an input data stream from a first application residing on the transmitting device;
   selecting either said first spread spectrum code or said second spread spectrum code based on quality of service (QOS) requirements associated with said first application; and
   applying the selected spread spectrum code to said input data stream, thereby generating said spread spectrum data stream.

5. The method of claim 1 wherein the step of routing said outgoing data stream to a broadband communication system further comprises using a geosynchronous satellite.

6. The method of claim 1 wherein the step of routing said outgoing data stream to a narrow band communication system further comprises using a low earth orbit satellite.

7. A method of discriminating and routing different types of data packets that are transmitted in a single data stream, comprising the steps of:
   providing a first spread spectrum data stream using a first spread spectrum code and a second spread spectrum data stream using a second spread spectrum code;
   combining said first spread spectrum data stream and said second spread spectrum data stream into an outgoing data stream;
   transmitting said outgoing data stream from a transmitting device over a communication channel to a network routing device;
   correlating said outgoing data stream with said first spread spectrum code to recover a first data stream and with said second spread spectrum code to recover a second data stream; and
   routing said first data stream to a narrow band communication system and said second data stream to a broadband communication system.

8. The method of claim 7 wherein the step of transmitting said outgoing data stream further comprises using a time division duplex, code division multiple access (CDMA) communication protocol.

9. The method of claim 7 wherein the step of providing a spread spectrum data stream further comprises the steps of:
   receiving an input data stream from a first application residing on the transmitting device;
   selecting said first spread spectrum code based on quality of service (QOS) requirements associated with said first application; and
   applying said first selected spread spectrum code to said input data stream, thereby generating said first spread spectrum data stream;

receiving a second input data stream from a second application residing on the transmitting device;

selecting said second spread spectrum code based on the quality of service (QOS) requirements associated with said second application; and applying said second selected spread spectrum code to said second input data stream, thereby generating said second spread spectrum data stream.

10. The method of claim 7 wherein said broadband communication system is further defined as a geosynchronous satellite.

11. The method of claim 7 wherein said narrow band communication system is further defined as a low earth orbit satellite.

12. A satellite communication system for discriminating and routing data packets in a single data stream from a transmitter to one of a plurality of satellites, comprising:

a low earth orbiting satellite;

a geosynchronous orbiting satellite;

an application residing on the transmitter for providing an input data stream, said transmitting device being operative to generate a spread spectrum data stream based on the quality of service (QoS) requirements associated with said application and transmit said spread spectrum data stream over a wireless communication channel;

a network routing device receiving said spread spectrum data stream, said network routing device being operative to correlate said spread spectrum data stream to recover said input data stream and route said input data stream to either said low earth orbiting satellite or said geosynchronous orbiting satellite.

13. The satellite communication system of claim 12 wherein the transmitter uses a time division duplex, code division multiple access (CDMA) communication protocol to transmit said spread spectrum data stream over said wireless communication channel.

14. The satellite communication system of claim 12 wherein the transmitter further comprising:

a code generator for providing at least two spread spectrum codes;

a modulator receiving said input data stream from said application, said modulator being operative to select a spread spectrum code from said code generator and apply said selected spread spectrum code to said input data stream, thereby generating a spread spectrum data stream.

15. The satellite communication system of claim 12 wherein the network routing device further comprising:

a code generator for providing at least two spread spectrum codes;

a demodulator receiving said spread spectrum data stream from the transmitter, said demodulator being operative to use a spread spectrum code from said code generator to recover said input data stream.

* * * * *